United States Patent [19]

Jones

[11] Patent Number: 4,547,785

[45] Date of Patent: Oct. 15, 1985

[54] APPARATUS AND METHOD FOR DROP DEFLECTION

[75] Inventor: David E. Jones, Layton, Utah

[73] Assignee: The Mead Corporation, Dayton, Ohio

[21] Appl. No.: 602,890

[22] Filed: Apr. 23, 1984

[51] Int. Cl.[4] .......... G01D 15/18

[52] U.S. Cl. .......... 346/1.1; 346/75

[58] Field of Search .......... 346/75, 1.1

[56] References Cited

U.S. PATENT DOCUMENTS

| | | | |
|---|---|---|---|
| 3,380,584 | 4/1968 | Fulwyler | 346/75 X |
| 3,647,138 | 3/1972 | Houser | 239/104 |
| 3,656,174 | 4/1972 | Robertson | 346/75 |
| 3,739,395 | 6/1973 | King | 346/75 |
| 4,123,760 | 10/1978 | Hou | 346/75 |
| 4,250,510 | 2/1981 | Dressler | 346/75 |
| 4,258,370 | 3/1981 | Paranjpe | 346/75 |
| 4,275,401 | 6/1981 | Burnett et al. | 346/75 |
| 4,307,407 | 12/1981 | Donahue et al. | 346/75 |
| 4,346,387 | 8/1982 | Hertz | 346/1.1 |

*Primary Examiner*—E. A. Goldberg
*Assistant Examiner*—Gerald E. Preston
*Attorney, Agent, or Firm*—Biebel, French & Nauman

[57] ABSTRACT

An ink jet printer including a drop deflecting arrangement for directing drops from a jet drop stream to a plurality of print positions on a print receiving medium. The printer includes a print head which produces at least one jet drop stream directed generally toward the print receiving medium. The stream emerges from the print head as an electrically grounded fluid filament which then breaks up into drops. A pair of electrodes is positioned on opposite sides of the fluid filament above the point of drop formation and extends along the path of the jet drop stream for a substantial distance. A means is provided for supplying first and second deflection potentials of equal magnitude but opposite polarity to the electrodes such that a deflection field, normal to the path of the jet drop stream, is produced. The ground plane of the field is aligned with the fluid filament so that drops produced are not charged. The deflection potentials are then shifted up or down to maintain the deflection field substantially constant while altering the field potential in the region of the filament. By this technique, drops which are passing through the deflection field receive a substantially constant deflection force in dependence upon the charge level which they carry, and selective charging of drops is accomplished simultaneously with the field.

18 Claims, 7 Drawing Figures

APPARATUS AND METHOD FOR DROP DEFLECTION

BACKGROUND OF THE INVENTION

The present invention relates to the field of drop deflection and has specific application to a recording or printing device in which one or more jets of ink are controlled to enable drops to be directed from each jet drop stream to a plurality of print positions on a moving print receiving medium. Further application may be made to drop dispensers or to particle separation.

A number of prior art jet printers have provided for servicing a plurality of print positions on a print receiving medium with each of a plurality of jets. Such printers have generally been relatively complicated in that a charge electrode assembly has been required for selective charging of drops in the jet drop streams, with the charge electrode assembly being separate from the deflection electrode assembly which provides a field to deflect charged drops in each jet drop stream. In one type of jet printer, shown in U.S. Pat. No. 3,739,395, issued June 12, 1973, to King, a plurality of jets, arranged in a row perpendicular to the direction of movement of the print receiving medium, are selectively charged on a binary basis. Two pairs of deflection electrodes, associated with each jet, generate orthogonal deflection fields through which the drops in each jet pass. The uncharged drops pass through the fields in a straight trajectory and a strike catcher extending beneath the row of jets. The first deflection electrode pair provides a static electrical field which deflects the charged jet drops in a direction substantially perpendicular to the row of jets such that they do not strike the catcher. Thereafter, the charged drops pass through a field provided by the second pair of electrodes and are laterally deflected in a direction parallel to the row of jets such that they strike the print receiving web at one of a plurality of print positions on the web. A cyclically varying potential is applied to the second pair of electrodes such that a cyclically varying electric field deflects charged drops to the print positions in a repeated sequence. Drops are in the cyclically varying deflection field for a substantial period of time, and some are exposed to the deflection field as it initially increases and then decreases. In some cases, the field may totally reverse during the time that a drop traverses the field. As a result, it may be difficult to produce deflection of the drops to preferred print positions.

In a different type of ink jet printer, such as shown in U.S. Pat. No. 4,307,407, issued Dec. 22, 1981, to Donahue et al, drops are subjected to a static deflection field to produce deflection to various print positions. The charge level carried by the drops is selected to produce deflection to the desired print positions or to a catcher structure. A charge electrode plate, separate from the balance of the printer structure, is required in the Donahue et al device to accomplish charging of the drops. In this device, as in most other prior art printers, drops are charged by applying an electric charge potential to a charge electrode positioned adjacent the fluid filament from which the drops are formed. The print head and the fluid filament are electrically grounded and, as a consequence, an electrical charge, proportional in amplitude to the electric charge potential on the charge electrode but opposite in polarity, is formed on the end of the fluid filament. This electric charge is carried away by a drop as the drop separates from the end of the fluid filament. An insulating space, downstream from the charge electrodes, must be provided to separate the fluid filaments from the deflection field or fields. This results in a fairly long drop path from the point of drop break off to the print receiving medium. This substantial distance can accentuate errors where the fluid filament is initially crooked due to imperfections in the print head.

Typical prior art in the areas of drop dispensing and particle separating is shown in Fulwyler U.S. Pat. No. 3,380,584 and in Robertson U.S. Pat. No. 3,647,138.

SUMMARY OF THE INVENTION

This invention provides a method of drop deflection wherin drops of conductive liquid are selectively charged and thereafter deflected by a common static electrical field. The electrical field is applied sidewardly across a continuously flowing stream of conductive liquid in a region extending downstream from the point of drop breakoff. The stream is connected to a source of reference potential, and drop charging is accomplished by changing the potential of the applied field at the drop breakoff location while maintaining a constant field strength throughout. Such potential changing may be accomplished by making equal adjustments to the potentials applied to two field generating electrodes positioned on opposite sides of the stream. Since the field strength is not changed, variable drop charging may be accomplished without affecting the deflection force applied to previously generated drops. Thus a single field may be used for charging and deflection.

An ink jet printer in accordance with this invention includes print head means for generating a jet drop stream directed generally toward a print receiving medium. A fluid filament emerges from the print head means and breaks up into the stream of ink drops. A pair of electrodes is positioned on opposite sides of the fluid filament above the point of drop formation and extends along the path of the jet drop stream for a substantial distance beyond the point of break up of the filament. A means is provided for supplying a first deflection potential to a first of the pair of electrodes and for supplying a second deflection potential of different magnitude to a second of the pair of electrodes such that an electric field between the pair of electrodes is produced. The stream of fluid is connected to a source of reference potential. A selective charging means simultaneously shifts the first and second deflection potentials by equal amounts in dependence upon the print position to which a drop then being formed is to be deflected. Drops are charged in dependence upon the field potential level at the end of the fluid filament, while a constant field strength is maintained between the electrodes. Charged drops are deflected in a manner which is unaffected by shifting of the first and second deflection potentials. The stream of fluid is preferably grounded, and the first and second deflection potentials are preferably of opposite polarity.

The selective charging means includes means for generating a cyclically varying drop charge potential signal having a plurality of discrete print potential levels, each of which is associated with a respective one of the print positions, and switch means for selectively superimposing the cyclically varying drop charge potential signal on the first and second deflection potentials such that the potential of the electric field at the end of the fluid filament is selectively varied to induce charging of drops to print charge levels, but the field strength experienced subsequently by the drops as they pass between the electrodes remains substantially constant.

The printer may further include drop catcher means for catching drops carrying a catch charge level. The selective charging means further comprises means for supplying a catch potential level to the switch means such that the switch means selectively superimposes the cyclically varying drop charge potential signal and the catch potential level on the first and second deflection levels to produce charging of drops to the catch charge level and the print charge levels.

The electric field may be non-parallel with respect to the direction of movement of the print receiving medium.

The printer may provide for directing drops from each of a plurality of jet drop streams to a plurality of print positions on a moving print receiving medium. The print head means generates a plurality of jet drop streams arranged in a row and directed generally toward the print receiving medium, with the streams emerging from the print head means as electrically grounded fluid filaments which break up into the streams of ink drops. A plurality of pairs of electrodes are provided, each such electrode pair being positioned on opposite sides of a corresponding one of the fluid filaments, above the point of drop formation thereof, and extending along the path of the jet drop stream emanating from the filament for a substantial distance beyond the point of break up of the filament. A means for supplying a first deflection potential of a first polarity to a first one of each of the pairs of electrodes and for supplying a second deflection potential of a second polarity, opposite to the first polarity, to a second one of each of the pairs of electrodes produces an electric field between each of the pairs of electrodes. A selective charging means shifts the first and second deflection potentials supplied to each of the pairs of electrodes by equal amounts in dependence upon the print position to which a drop then being formed from the corresponding fluid filament is to be deflected, whereby drops are charged in dependence upon the field potential level at the end of each of the fluid filaments and a uniform field is maintained between each of the pairs of electrodes. The charged drops are laterally deflected in a manner which is unaffected by shifting of the first and second deflection potentials.

The selective charging means may include means for generating a cyclically varying drop charge potential signal having a plurality of discrete print potential levels, each of which is associated with a respective one of the print positions, and a switch means for selectively superimposing the cyclically varying charge potential signal on the first and second deflection potentials supplied to each of the pairs of electrodes. The potential of the electric field at the end of each of the fluid filaments is selectively varied to induce charging to print charge levels, but the field strength experienced subsequently by the drops as they pass between the electrodes remains substantially constant. The printer may further include a drop catcher means for catching drops carrying a catch charge level.

The selective charging means may further comprise means for supplying a catch potential level to the switch means such that the switch means selectively superimposes the cyclically varying drop charge potential signal and the catch potential level on the first and second deflection levels supplied to each of the pairs of electrodes to produce charging of drops to the catch charge level and the print charge levels.

The drop catcher means may extend generally parallel to and to one side of the row of jet drop streams and the printer may further include means for producing a secondary deflection field of a strength sufficient to deflect drops carrying a catch charge level to the catcher means. The electric fields between each of the pairs of electrodes extend generally parallel to the row and the secondary deflection field extends generally perpendicular to the row.

Accordingly, it is an object of the present invention to provide an ink jet printer in which drops from at least one jet drop stream are selectively charged by use of the same electrode structure which provides a deflection field of substantially constant field strength; to provide such a printer in which a cyclically varying charging signal is superimposed on first and second deflection potentials of equal magnitude and opposite polarity with such deflection potentials being applied to deflection electrodes positioned on opposite sides of the jet drop stream; and to provide such a printer in which a catch potential level may be selectively superimposed on the deflection potentials to produce charging of drops for deflection to a catcher.

Other objects and advantages of the invention will be apparent from the following description, the accompanying drawings and the appended claims.

DETAILED DESCRIPTION OF THE PREFERRED EMBODIMENT

Figure 1:
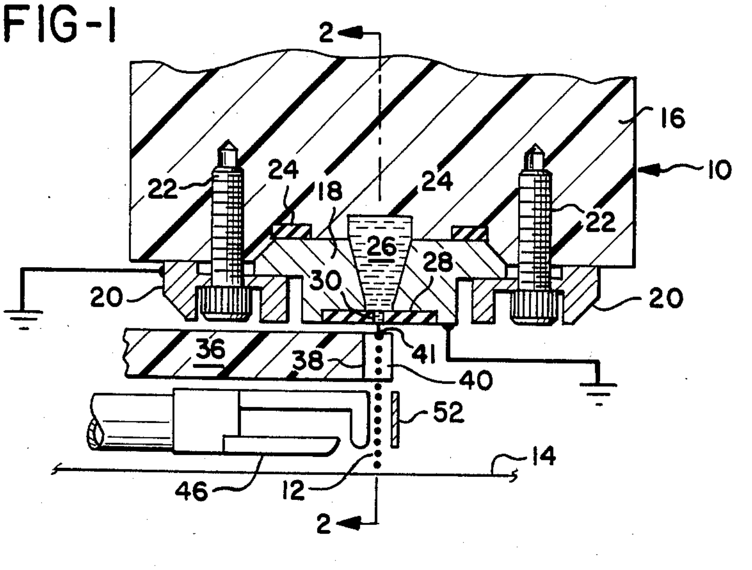
FIG. 1 is a sectional view of the ink jet printer of the present invention taken in a plane generally perpendicular to the row of jet drop streams.

Reference is now made to FIG. 1 which is a sectional view of the ink jet printer of the present invention. A print head means 10 is provided for generating a plurality of jet drop streams 12 directed toward a continuously moving print receiving medium 14. The streams 12 are arranged in a row extending generally perpendicular to the plane of the sectional view of FIG. 1 and this row, in turn, is substantially perpendicular to the direction of movement of the print receiving medium 14. The print head means includes an upper assembly 16 and a lower assembly 18 which are held together by clamping bars 20, extending the length of the print head means 10, and threaded bolts 22. Gasket 24 provides a fluid tight seal between the upper assembly 16 and the lower assembly 18, which assemblies together form a fluid receiving manifold 26. An orifice plate 28 extends the length of the manifold 26 and defines a plurality of orifices 30 from which fluid filaments 41 emerge. Fluid drops periodically separate from the ends of the fluid filaments, thereby forming the jet drop streams.

In order to increase the uniformity of drop size and the regularity of drop formation, any of a number of jet stimulation techniques may be used. One such technique, disclosed in U.S. Pat. No. 3,701,998, issued Oct. 31, 1972, to Mathis, is to provide mechanical stimulation to the orifice plate at one end of the print head means 10, causing bending waves to travel along the length of the orifice plate. These bending waves create pressure varicosities in the fluid filaments emerging from the orifices 30, thus stimulating the formation of drops from the tips of the filaments.

Figure 2:
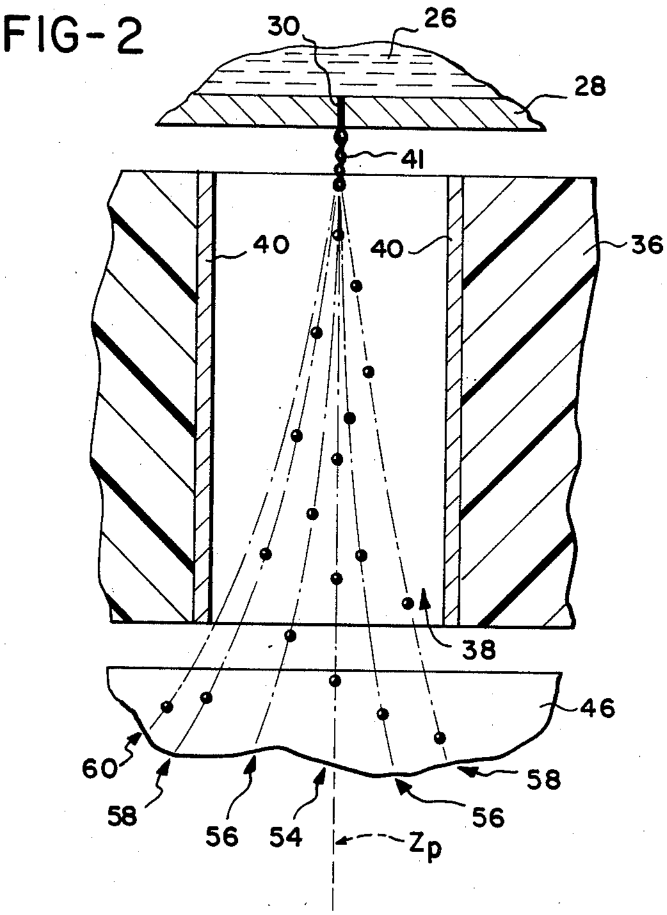
FIG. 2 is a partial enlarged sectional view taken generally along line 2—2 in FIG. 1.
Figure 3:
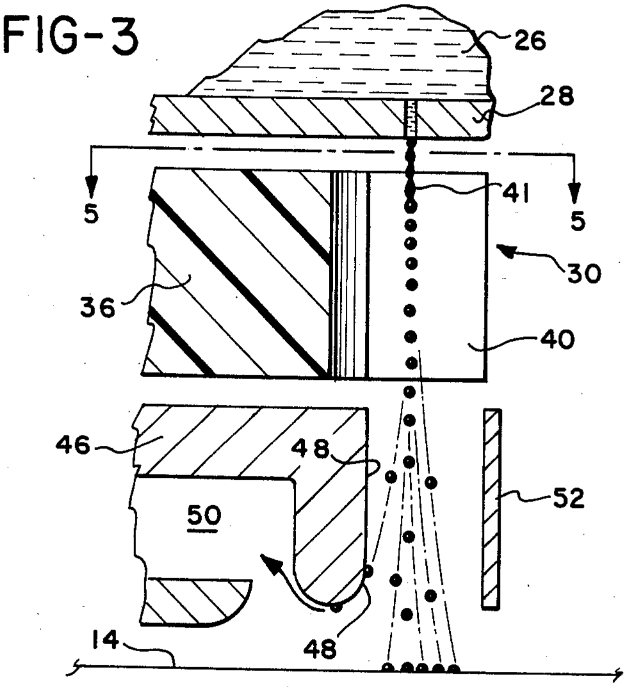
FIG. 3 is an enlarged partial sectional view taken in a plane corresponding generally to FIG. 1.
Figure 4:
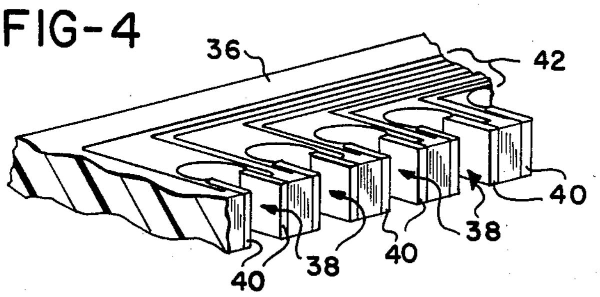
FIG. 4 is a perspective view of a portion of the deflection electrode arrangement of the printer.

As illustrated more fully in FIGS. 2–4, the orifice plate 28 is positioned above a deflection electrode plate 36 having notches 38 defined therein which partially surround each of the jet drop streams 12. A plurality of pairs of electrodes 40 are positioned on opposite sides of corresponding ones of the fluid filaments 41 above the point of drop formation and extending along the path of the jet drop stream 12 for a substantial distance. When first and second deflection potentials of opposite polarity are supplied to opposing electrodes 40, an electric field is produced which extends between the pair of electrodes in a direction substantially parallel to the row of jet drop streams. As shown in FIG. 4, conductors 42, which may be printed circuit conductors on the surface of plate 36, provide a means for connecting each pair of electrodes to first and second deflection potentials, respectively. The deflection potentials are of equal magnitude but opposite in polarity. This produces a deflection field having a zero potential or ground plane $Z_P$ located precisely halfway between the electrodes 40. Zero potential plane $Z_P$, when thus positioned, coincides precisely with the associated fluid filament, as shown in FIG. 2. Since the fluid filament 41 is electrically grounded, no potential difference exists between the filament and the field potential and, therefore, drops formed from the filament 41 are uncharged and pass downward through the deflection field unaffected by the field.

The present invention recognizes and takes advantage of the fact that the amount of deflection experienced by charged drops is a function of field strength, while charging of the drops by the field is a function of field potential in the region of the fluid filament. Field strength is directly proportional to the voltage differential between opposing electrodes 40 and inversely proportional to the spacing between the electrodes. Since the electrodes remain a fixed distance apart, if the potential difference between the plates is held constant, a field of constant strength will result. The field is directed sidewardly of the fluid filament.

As an example, if the voltage on both of the electrodes is simultaneously raised by +10 volts, the field strength and the force exerted on the drops in the field will be unaltered. The zero potential ground plane will be shifted, however, toward one of the electrodes 40. This, in turn, will result in the fluid filament 41 being positioned in the field in a region of non-zero field potential. As a consequence, an electric charge will form on the end of the fluid filament. The magnitude of the charge will be directly related to the magnitude of the field in the region of the fluid filament, but will be of opposite polarity. When a drop is formed from the end of the filament, this drop will carry away with it a substantial charge. The drop will then experience a lateral, deflecting force produced by the field between plates 40, such that the trajectory of the drop will be deflected.

An electrically grounded catcher 46 of conventional construction is provided beneath the deflection electrode plate to catch selected drops and prevent them from striking the print receiving medium. The catcher 46 extends parallel to the row of jet drop streams and is positioned on one side of the row. A surface 48 is struck by drops deflected to the catcher 46. The drops run down surface 48 and are ingested into a vacuum cavity 50. A catch electrode 52 extends along the row of jet drop streams, directly opposite the surface 48. A relatively high D.C. voltage is supplied to electrode 52 to produce a secondary deflection field of a strength sufficient to deflect drops carrying a catch charge level to the catcher 46.

Figure 5:
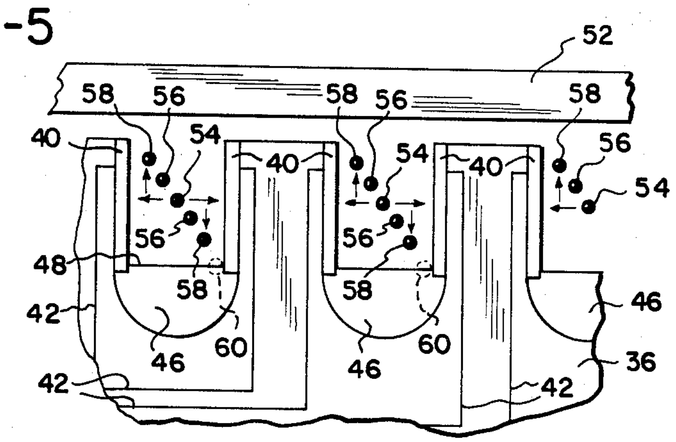
FIG. 5 is a view taken generally along line 5—5 in FIG. 3.

It will be appreciated that the deflection between electrodes 40 will be substantially parallel to the row of jet drop streams, while the deflection between catcher 46 and deflection electrode 52 will be generally perpendicular to the row of jet drop streams. As seen in FIG. 5, therefore, the drops are initially deflected laterally between opposing electrodes 40 and, subsequently, are deflected between catcher 46 and electrode 52 to produce a skewed row of print positions associated with each jet drop stream. Drops 54 are uncharged drops which pass downward, unaffected by either of the fields. Drops 56 illustrate the final position of drops which carry an intermediate charge level. These are deflected laterally slightly by the field between electrodes 40 and, thereafter, are deflected by the secondary field between electrode 52 and catcher 46 in an orthogonal direction. Finally, drops 58 carry a higher charge level and are therefore deflected more by both of the fields. Drops 60 carry a catch charge level which is greater than any of the print charge levels and they are deflected sufficiently such that they strike the surface 48 of catcher 46 and are prevented from being deposited on the print receiving medium 14.

Figure 6:
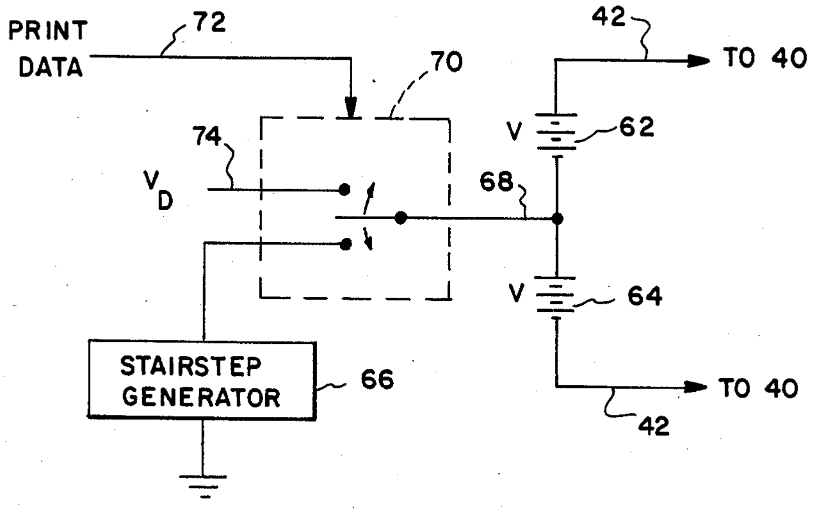
FIG. 6 is an electrical schematic representation of the switching arrangement associated with the deflection electrodes.
Figure 7:
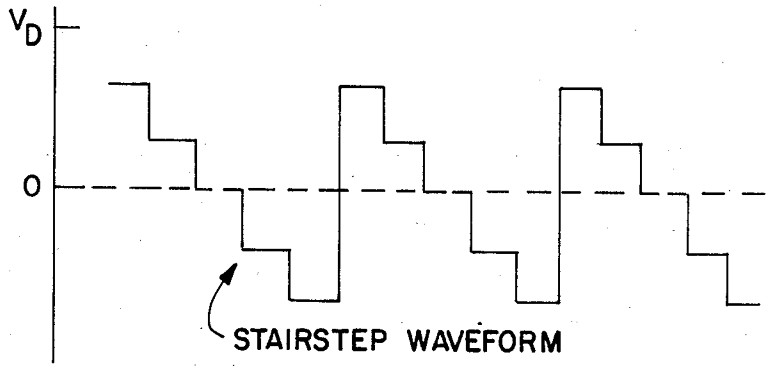
FIG. 7 illustrates the wave shape of the cyclically varying drop charge potential signal which is superimposed selectively on the first and second deflection potentials.

FIGS. 6 and 7 illustrate schematically the control circuitry associated with one jet drop stream, it being understood that additional circuitry is required for each of the jet drop streams. D.C. potential sources 62 and 64 are connected in series to provide a first deflection potential +V of a first polarity to a first one of a pair of electrodes 40, and a second deflection potential −V of a second polarity, opposite to the first polarity, to a second one of the pair of electrodes 40. A stairstep generator circuit 66 provides a cyclically varying drop charge potential signal, illustrated in FIG. 7, which has a plurality of discrete print potential levels. Each of the potential levels is associated with a respective one of the print positions serviced by the jet drop stream. This stairstep signal when applied to line 68 by switch 70 shifts the first and second deflection potentials by equal amounts. As a consequence, the drops then being produced by the fluid filament will be charged to successive print charge levels and appropriately deflected to the various print positions. Switch 70 may be switched under control of control input 72 so that line 68 is connected to line 74. A catch potential level $V_D$ is continuously applied to line 74 and, if connected via switch 70 to line 68, produces a shift of the potentials on electrodes 40 sufficient to produce a catch charge level on the drop or drops then being formed. As a consequence, these drops will be caught by catcher 46.

It may be seen, therefore, that this arrangement will produce the deposit of drops from a jet in a cyclical fashion at each of the print positions serviced by the jet. It is understood that since the print receiving medium is continuously transported past the printer a line of drops from each of the print positions will result. By controlling the deposit of drops along these lines, a print image is formed on the print receiving medium. As is clear from FIG. 5, a substantial gap exists between the print positions serviced by adjacent jets. Ink may be deposited on the print receiving medium in the gap areas between jets by a second printer positioned elsewhere along the path of the print receiving medium. Although a multiple jet printer is illustrated in the accompanying drawings, it will be appreciated that the present invention will also find application with single jet printers.

It will also be appreciated that pairs of cooperating electrodes 40 need not be connected to sources of opposite polarity. It is only necessary that the sources have different magnitudes and that these magnitudes be adjusted by like amounts so as to maintain a constant strength field therebetween. Likewise it is not necessary that the fluid filament be grounded. So long as the filament is electrically conductive, the tip thereof will carry an electrical charge corresponding to the difference between its own potential and the potential of the surrounding electrical field. The resulting charged drops will be subjected to an unchanging electrical field in accordance with this invention and will be deflected to the desired locations. The catcher, of course, may be positioned at any one of those desired locations consistent with geometrical constraints.

The disclosed apparatus and method have applications other than ink jet printing. For example, utility may be found as a particle separator for any of the uses mentioned in Fulwyler U.S. Pat. No. 3,380,584.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An ink jet printer for directing drops from a jet drop stream to a plurality of print positions on a print receiving medium, comprising:

print head means for generating a jet drop stream directed generally toward said print receiving medium, said stream emerging from said print head means as an electrically grounded fluid filament which breaks up into the stream of ink drops, a pair of electrodes, said electrodes being positioned on opposite sides of said fluid filament above the point of drop formation and extending along the path of said jet drop stream for a substantial distance beyond the point of break up of said filament, means for supplying a first deflection potential of a first polarity to a first of said pair of electrodes and for supplying a second deflection potential of a second polarity, opposite to said first polarity, to a second of said pair of electrodes such that an electric field between said pair of electrodes is produced, and selective charging means for simultaneously shifting said first and second deflection potentials by equal amounts in dependence upon the print position to which a drop then being formed is to be deflected, whereby drops are charged in dependence upon the field potential level at the end of said fluid filament, and a field of constant strength is maintained between said electrodes such that charged drops are laterally deflected in a manner which is unaffected by shifting of said first and second deflection potentials.

2. The ink jet printer of claim 1, in which said selective charging means comprises:

means for generating a cyclically varying drop charge potential signal having a plurality of discrete print potential levels, each of which is associated with a respective one of said print positions, and switch means for selectively superimposing said cyclically varying drop charge potential signal on said first and second deflection potentials such that the potential of the electric field at the end of said fluid filament is selectively varied to induce charging of drops to print charge levels, but the field strength experienced subsequently by the drops as they pass between said electrodes remains substantially unchanged.

3. The ink jet printer of claim 2, further comprising drop catcher means for catching drops carrying a catch charge level.

4. The ink jet printer of claim 3, in which said selective charging means further comprises means for supplying a catch potential level to said switch means such that said switch means selectively superimposes said cyclically varying drop charge potential signal and said catch potential level on said first and second deflection levels to produce charging of drops to said catch charge level and said print charge levels.

5. The printer of claim 1 in which said electric field is non-parallel with respect to the direction of movement of said print receiving medium.

6. An ink jet printer for directing drops from each of a plurality of jet drop streams to a plurality of print positions on a print receiving medium, comprising:

print head means for generating a plurality of jet drop streams arranged in a row and directed generally toward said print receiving medium, said streams emerging from said print head means as electrically grounded fluid filaments which break up into streams of ink drops, a plurality of pairs of electrodes, each electrode pair being positioned on opposite sides of a corresponding one of said fluid filaments above the point of drop formation thereof and extending along the path of the jet drop stream emanating from the filament for a substantial distance beyond the point of break up of said filament, means for supplying a first deflection potential of a first polarity to a first one of each of said pairs of electrodes and for supplying a second deflection potential of a second polarity, opposite to said first polarity, to a second one of each of said pairs of electrodes such that an electric field between each of said pairs of electrodes is produced, and selective charging means for simultaneously shifting said first and second deflection potentials supplied to each of said pairs of electrodes by equal amounts in dependence upon the print position to which a drop then being formed from the corresponding fluid filament is to be deflected, whereby drops are charged in dependence upon the field potential level at the end of each of said fluid filaments and a field of constant strength is maintained between each of said pairs of electrodes such that charged drops are laterally deflected in a manner which is unaffected by shifting of said first and second deflection potentials.

7. The ink jet printer of claim 6, in which said selective charging means comprises:

means for generating a cyclically varying drop charge potential signal having a plurality of discrete print potential levels, each of which is associated with a respective one of said print positions, and switch means for selectively superimposing said cyclically varying drop charge potential signal on said first and second deflection potentials supplied to each of said pairs of electrodes such that the potential of the electric field at the end of each of said fluid filaments is selectively varied to induce charging of drops to print charge levels but the field strength experienced subsequently by the drops as they pass between said electrodes remains substantially constant.

8. The ink jet printer of claim 7 further comprising drop catcher means for catching drops carrying a catch charge level.

9. The ink jet printer of claim 8, in which said selective charging means further comprises means for supplying a catch potential level to said switch means such that said switch means selectively superimposes said cyclically varying drop charge potential signal and said catch potential level on said first and second deflection levels supplied to each of said pairs of electrodes to produce charging of drops to said catch charge level and said print charge levels.

10. The printer of claim 9 in which said drop catcher means extends generally parallel to and to one side of said row of jet drop streams and in which said printer further comprises means for producing a secondary deflection field of a strength sufficient to deflect drops carrying a catch charge level to said catcher means.

11. The printer of claim 10 in which the electric fields between each of said pairs of electrodes extend generally parallel to said row and in which said secondary deflection field extends generally perpendicular to said row.

12. A method of deflecting drops of electrically conductive liquid in correspondence with variations in a control signal, comprising the steps of:

establishing a continuously flowing stream of said liquid, connecting said stream to a reference potential souce, establishing a static electrical field directed sidewardly of said stream and extending therealong from the point where said stream breaks up into drops to at least a portion of the drop trajectory extending downstream therefrom, maintaining a substantially constant strength throughout said electrical field while varying the potential thereof at said drop breakup point in accordance with said control signal variations.

13. A method according to claim 12 wherein said static electrical field is established by positioning a pair of electrodes on opposite sides of said stream and applying different electrical potentials thereto.

14. A method according to claim 13 wherein said step of varying said field potential is accomplished by making like changes in said different electrical potentials.

15. A method according to claim 14 wherein said reference potential is a ground potential.

16. A method according to claim 15 wherein one of said different electrical potentials is a positive potential and the other is a negative potential.

17. Apparatus for selectively directing drops of conductive liquid toward a drop receiving member, comprising:

stream generating means for generating a continuously flowing stream of said liquid and directing said stream toward said drop receiving member, means for connecting the source of said stream to a source of reference potential, means for supporting said drop receiving member at a distance sufficiently far from said stream generating means to permit said stream to break up into drops.

a pair of electrodes positioned on opposite sides of said stream and extending from the point of said breakup to other points downstream therefrom, means for applying first and second deflection potentials of different magnitudes to different ones of said pair of electrodes, and control means for simultaneously shifting said first and second deflection potentials by equal amounts in dependence upon a desired deflection for a drop then being formed.

18. Apparatus according to claim 17 wherein said reference potential is a ground potential and said first and second deflection potentials are of opposite polarity.

* * * * *